United States Patent
Jakubek (10) Patent No.: US 10,168,437 B2
(45) Date of Patent: Jan. 1, 2019

(54) DETECTOR OF IONIZING RADIATION ENABLING A COHERENT DIGITAL IMAGE

(71) Applicants: ADVACAM s.r.o., Prague (CZ); Ceske vysoke uceni technicke v Praze, Prague, Albertov (CZ)

(72) Inventor: Jan Jakubek, Hyskov (CZ)

(73) Assignees: ADVACAM S.R.O., Prague (CZ); CESKE VYSOKE UCENI TECHNICKE V PRAZE, Prague (CZ)

( * ) Notice: Subject to any disclaimer, the term of this patent is extended or adjusted under 35 U.S.C. 154(b) by 119 days.

(21) Appl. No.: 14/914,371

(22) PCT Filed: Aug. 26, 2014

(86) PCT No.: PCT/CZ2014/000091
§ 371 (c)(1),
(2) Date: Feb. 25, 2016

(87) PCT Pub. No.: WO2015/027968
PCT Pub. Date: Mar. 5, 2015

(65) Prior Publication Data
US 2016/0209521 A1  Jul. 21, 2016

(30) Foreign Application Priority Data
Aug. 30, 2013  (CZ) .................................. 2013-669

(51) Int. Cl.
*G01T 1/29* (2006.01)
*G01T 1/24* (2006.01)

(52) U.S. Cl.
CPC ............ *G01T 1/2928* (2013.01); *G01T 1/243* (2013.01)

(58) Field of Classification Search
CPC ............................. G01T 1/2928; G01T 1/243
See application file for complete search history.

(56) References Cited

U.S. PATENT DOCUMENTS 4,467,342 A * 8/1984 Tower ................. H01L 25/0655
257/222
5,834,782 A * 11/1998 Schick ................. H04N 3/1593
250/208.1
(Continued)

FOREIGN PATENT DOCUMENTS

EP        0 421 869 A1    4/1991
GB        2 332 608 A     6/1999
(Continued)

OTHER PUBLICATIONS

International Search Report, dated Feb. 17, 2016.
Written Opinion of the International Searching Authority, dated Feb. 17, 2016.

*Primary Examiner* — Christine S Kim
(74) *Attorney, Agent, or Firm* — Mark M. Friedman (57) ABSTRACT

A detector of ionizing radiation, e.g. x-ray radiation, allowing for the creation of a continuous digital image of a scanned object. The detection surface is formed by a mosaic of detector segments arranged in a matrix and consisted of a sensor layer arranged on a chip reader with the formation of tiers to engage an adjacent detector segment. The sensor layer is active over its entire area, and the matrix is provided with a means for positioning the detector segments to define their mutual lateral clearance less than the size of one pixel. The positioning means preferably comprises a carrier of rows. The resulting detection surface is active over its entire area and allows for the direct creation of continuous digital image without dead zones.

16 Claims, 7 Drawing Sheets

(56) References Cited

U.S. PATENT DOCUMENTS

| | | | |
|---|---|---|---|
| 6,207,944 B1 * | 3/2001 | Spartiotis | H01L 27/14601 250/208.1 |
| 6,403,964 B1 * | 6/2002 | Kyyhkynen | G01T 1/243 250/366 |
| 6,747,277 B2 * | 6/2004 | Mori | H01L 27/14663 250/370.01 |
| 7,622,719 B2 * | 11/2009 | Spahn | G01T 1/2018 250/370.11 |
| 2001/0012412 A1 | 8/2001 | Schulman | |
| 2003/0155516 A1 * | 8/2003 | Spartiotis | G01T 1/2928 250/370.09 |
| 2004/0200971 A1 * | 10/2004 | De Keyser | A61B 6/00 250/370.09 |
| 2008/0192891 A1 * | 8/2008 | Mori | G01T 1/2018 378/62 |
| 2012/0133054 A1 | 5/2012 | Tkaczyk et al. | |

FOREIGN PATENT DOCUMENTS

| | | |
|---|---|---|
| WO | 95/33332 A2 | 12/1995 |
| WO | 2013/050229 A1 | 4/2013 |

* cited by examiner

DETECTOR OF IONIZING RADIATION ENABLING A COHERENT DIGITAL IMAGE

FIELD OF THE INVENTION

The invention relates to a detector of ionizing radiation for creating a coherent digital image of the scanned object, usable in particular in the field of flaw detection, non-destructive materials testing, product quality control, and also in medicine and biotechnology.

BACKGROUND OF THE INVENTION

Detectors of ionizing radiation for creating an image of a scanned object, namely detectors of X-rays, gamma rays, beta rays or other ionizing radiation are used not only in medicine, biology and biotechnology, but they are also widely used in industrial applications where they are particularly used as a means of non-destructive testing of any objects from the detection of defects in materials for quality control, to customs and police or security checks on delivered goods and transported objects.

The image of the scanned object is transmitted to a display area, either directly (projection display) or by data from the detector being computer-processed, the subsequent image created using the appropriate computer hardware and software.

The display area exists in many forms; the oldest type of display area is photosensitive film. With the advent of digitization, the most commonly used display areas are now scintillation screens (e.g. CsI, Gadox, NaI (TI), BGO, LYSO) in combination with photodetectors operating in the range of visible light (e.g. CCD or CMOS sensors). These systems utilize the principle of double conversion: radiation is first converted in the scintillator into visible light, then converted to electrical signal using a photodetector. The electrical signal is then processed using the appropriate hardware or software which creates an image on a screen or another medium.

In recent years, semiconductor detectors are becoming increasingly used as radiation detectors for imaging, operating on the principle of only a single conversion, when the impacting radiation generates an electrical signal directly in the semiconductor element. On one semiconductor chip, a large number of thus functioning elements (pixels) are created to form the image sensor. The signal from each element is further processed in specialized hardware and software that creates the final image. These detectors of radiation are known as semiconductor pixel detectors or sensors and are manufactured from different semiconductor materials such as silicon, CdTe, GaAs, etc.

Hardware for processing the electrical signals from each pixel is often formed on an independent chip, which is called an electronic reader chip, abbreviated as a reader chip. The chip of the semiconductor pixel sensor is usually located directly on the chip reader (overlapping) and is electrically connected to it with matrix contacts. Such an arrangement of both chips composes a non-separable unit which is referred to as a hybrid semiconductor pixel detector, or a hybrid detector, for short. The reader chip is fitted on at least one side with peripheral contacts used for power and communication with the hybrid detector. The area of the peripheral reading sensor is usually not covered by a pixel sensor chip, which allows for the connection of external conductors.

Examples of hybrid semiconductor hybrid detectors include the hybrid detectors Medipix2, Medipix3 and Timepix developed by the international collaboration of Medipix2 and Medipix3, or the hybrid detectors Pilatus and Eiger developed at the Paul Scherrer Institute. The thickness of the sensor layer is typically in the range of 50-2000 µm, wherein sensors for imaging are preferably used with a thickness of 300 µm and more. The sensors are mainly made from silicon crystal, less often from crystal CdTe or Cd(Zn) Te. Individual pixels are generally square shaped with a side of 55 µm (Medipix2, Medipix3, Timepix), 75 µm (Eiger), 172 µm (Pilatus), etc.

For hybrid semiconductor pixel detectors, the problem arises of creating a coherent image of a larger scanned object, because the maximum size of the detection area of one hybrid detector is limited by its maximum technologically achievable size. The typical technological limit in the production of reader chips is in units of $cm^2$ (often shaped in a square with dimensions of 20×20 $mm^2$). For larger areas, the probability of manufacturing defects is already high, and production becomes inefficient. The larger detection area must therefore be composed as a mosaic of several independent hybrid detectors. Each hybrid detector of this mosaic becomes one segment of a larger detection area. Hereinafter, the term "detector segment" will thus indicate a hybrid detector which is part of a larger detection area.

During the construction of larger detection areas to form a continuous image (larger detection area meaning that the area is larger than the area of one detector segment), systems are therefore used that enable the combination of detector segments into the detector surface with the mounting of individual detector segments into a flat matrix. The contacts of the periphery of the reader chip are connected to the bus in the flat matrix.

The problem which must be addressed in mosaic structure of the detection area is that the known solutions of detector segments use a sensor layer which have inactive (non-sensitive) edges and which therefore do not permit the detection of radiation and the design of an image from the entire area of the sensor layer. This gives rise to a so-called dead edge zone, or frames around the perimeter of individual detector segments that make it impossible to create a coherent image but divide the image into individual image segments from individual chips.

The solution according to international patent application WO 95/33332 to eliminate dead zones or frames from the inactive edges of the sensor layer of detector segments assembled into a mosaic consists in the mosaic containing vertically more layers of detector segments, the rows of which overlap each other so that the edge of the bottom row overlaps the edge of the upper row from the bottom. The detection area and the scanned subject move relative to each other at the same time, and using software for composing the display from individual detector segments in different positions of relative movement produces a continuous image of the scanned object with the elimination of dead zones. The disadvantage of this solution lies in the fact that the operation of the detector requires calibrated equipment for producing the relative movement and appropriate special software, so the manufacture and operation of such a detector is therefore complicated and costly. Overlapping insensitive edges also reduces the sensitivity of the detector in the marginal areas.

Other known solutions of mosaic detectors, e.g. according to the published patent application EP 0421 869 (A1) and US 2001/0012412 (A1), for the more efficient creation of mosaics and easier connection of the output wires from the periphery of individual detector segments to the bus at the bottom carrier matrix, use a tiered arrangement of the detector segments.

The detector segments, according to these documents, is configured such that the bottom reader chip on one side of a square or rectangular detector segment overlaps the upper sensor layer. This overlap forms a tier in which first, the output wires are led out from the reader chip to the bus, and secondly, that this tier in the composite mosaic is overlapped by the edge of the adjacent detector segment. The detector segments are stacked in the mosaic by individual lines, where the overlaps, respectively tiers, are oriented on one side of the tow, so the following row always overlaps the previous row. The tiered, respectively stepped, arrangement of rows in the detection area does not result in a defective image, since the tilt angle of the detector segments is minimal and can be easily corrected to create a digital image. Even here, however, due to the location of the insensitive material above the sensitive layer a reduction in sensitivity occurs in these areas.

According to document US 2011/0012412 (A1) a construction of detector is known in which the lower matrix is formed such that the rows of detector segments overlap stepwise or on a plane, while each detector segment is replaceable. To this end, each detector segment is fastened on a chip carrier which is mounted by a screw to the bottom of the matrix. The chip carrier may be flat or wedge-shaped, depending on whether the display area has to be stepped or substantially planar. Between the chip carrier and the lower matrix there is inserted an insulating layer with conductive contacts for each chip carrier. The chip carrier also serves as a bus for the output conductors of the reading chip, which lead into the chip carrier. The device according to US 2001/0012412 A1 partially eliminates the problem of dead zones in the creation of a coherent image, but only in areas in which the edges of the sensor layers of individual detector segments overlap, i.e. in lines of individual rows of the detector surface. Even though the segments are placed close side by side, their side edges, respectively the area along the side edges, still show inactive surfaces that form dead zones in the final image of the scanned object. These dead zones, in the creation of a coherent image, must be digitally blurred and overlapped, which, however, when used in medicine or flaw detection is a serious problem in terms of inaccuracies of the resulting image. The inactive edges of detector segments used in the solution according to US 2001/0012412 A1 arise in the manufacture of the sensor layers of the detector segments. The individual segments of the sensor layer are produced by cutting material from larger boards, which causes damage to the material in the area adjacent to the cut, so this narrow region along the edge, respectively sides, of a square or rectangular segment is inactive and cannot detect radiation. Solutions according to US 2001/0012412 A1 may eliminate some of the disadvantages of the solutions according to WO 95/33332, but they do not eliminate the fundamental problem of the existence of dead zones in the continuous image of the scanned object, so therefore a coherent and realistic image of the scanned object is not created by this solution.

Another disadvantage of the solution according to US 2001/0012412 A1 consists in that although the carriers of individual detector segments are fixed in the matrix of the detector surface removably, it is only in a specific and fixed position which does not allow for the positioning of detector segments to the side to limit their mutual lateral clearance. This creates gaps between the detector segments which form other dead zones that prevent the creation of a contiguous digital image.

The present invention is therefore to create such a detector of ionizing radiation which would eliminate the shortcomings of known solutions and would allow for the creation of a completely coherent and realistic digital image of the scanned object without the need for extra hardware or software resources to compensate for dead zones.

SUMMARY OF THE INVENTION

The above shortcomings of known detectors are eliminated by the detector according to the present invention. The detector of ionizing radiation enabling a coherent digital image of a scanned object includes a matrix and a detection area connectable using hardware and software resources with a display area. The detection area consists of mosaically arranged semiconductor pixel detector segments of square or rectangular shape, arranged side by side in rows. Each detector segment consists of sensor layers arranged on the reader chip so that the edge of the reader chip on one side overlaps the edge of the sensor layer and creates a tier for engaging the edge of the next segment detector of the adjacent row and in degrees, and output conductors lead from the periphery of the reader chip in the area of the tier. Each detector segment is mounted on a chip carrier which is detachably attached to the matrix.

The essence of the detector according to the invention is characterized in that the sensor layer of the segment detector is active over its entire area, including the area constituting the peripheral edge of the sensor layer, and the matrix is equipped with at least one means for positioning the detector segments for limiting the mutual clearance between the sensor layers of the adjacent detector segments to a value of less than the size of one image pixel. The advantage of this arrangement is that the edges of the sensor layers do not generate any dead zones or inactive frames, and by minimizing the gap between adjacent detector segments and arranging them tightly next to each other, the detection area can capture a continuous and coherent image of the entire scanned object without the need for hardware or software modification.

In a preferred embodiment of the detector according to the invention, a means of positioning the detector segments in relation to the matrix is arranged with the possibility of movement in the four directions of the coordinate system in the plane of the matrix. By this arrangement of the positioning means, the clearance between the sensor layers of adjacent detector segments can be reduced in the longitudinal and transverse direction.

In another preferred embodiment of the detector according to the invention, the means of positioning the detector segments composes at least one row carrier, which is attached to the matrix with the possibility of relative movement and lockable in a selected position relative to the matrix. In the row carrier there are, closely adjacent and arranged in parallel, detector segments chip on carrier chips such that the front edge of the detector segments overlaps the contour line of the row carrier and the rear edge of the detector segments with tiers and output conductors wires is located on the row carrier. This preferred embodiment of the invention is based on the finding that the sides of the sensor layers of the detector segments in one row can be held tightly together substantially without clearance and attached in this position for mounting directly on the row carrier. Nonetheless, the clearance between the individual rows, respectively between the rear tiered edges of the detector segments in one row and the front overlaps of the detector segments in the second parallel line, must be limited according to a specific position and dimensional tolerances of the sensor layers, respectively detector segments, which can be advantageously implemented using positionally adjustable and lockable row carriers.

It is advantageous if the row carrier is formed by a longitudinal profile having a cross sectional shape with "L" profile with a vertical portion and a horizontal portion, the chip carriers having a quadrangular cross section and being mounted in an "L" profile of the row carrier next to each other, wherein their side edges are arranged at the same time with the lateral edge as an "L" profile and their upper edges are arranged at the same level or higher than the upper edge of the "L" profile. The detector segments, in comparison to the side edge of the "L" profile and side edges of the chip carriers, show an overlap for placing the detector segments arranged in the adjacent row in tiers. The creation of a row carrier in an "L" shape is optimal for the use of the matrix space, both horizontally between the individual rows and vertically.

From a structural viewpoint it is advantageous if the length of the overlap of the detector segments is equal to or greater than the sum of the length of the tier and the width of the vertical part of the "L" profile of the row carrier. If the length of the overlap is the same, no gaps are produced between the rows. If the length of the overlap is greater than the sum of the lengths of the tiers and widths of the vertical portion of the "L" profile of the row carrier, there form, between the side edges of the row carrier and chip carrier in one row and the edge of the adjacent row carrier, technical passages that can be used, besides as space for mechanical positioning, also for e.g. cooling channels for cooling the detector, for bus channels, etc.

In another preferred embodiment of the detector according to the invention, the chip carriers are mounted to the horizontal part of the "L" profile of the row carriers by means of fixing screws, the screw head being arranged on the underside of the row carrier. Chip carriers can be mounted in a different way, but the mounting screws are preferred because the chip carrier assembly or disassembly, when replacing a defective or damaged detector segment, is quick and easy.

From a structural point of view, it is also advantageous when the upper edge of the chip carrier extends across the upper edge of the row carrier. At the upper edge of the row carrier, a gap thus forms in which buses are stored for connecting the output lines of detector segments.

Another preferred embodiment of the row carrier in terms of the possibility of adjusting its positioning and subsequent locking is such that the row carrier is provided with at least two oval adjusting holes, while an adjusting cam fits into each opening, stored in the matrix with controls accessible from the outside of the matrix, and the row carrier is fastened to the matrix by at least one fastening screw. When adjusting the relative position of the individual rows and to minimize the clearance between the sensor surfaces of the detector segments in adjacent rows, the position of the row carrier is set by turning the adjusting cams in the oval adjusting holes, and in the resulting optimum position the row carrier is locked by tightening the mounting screw.

To facilitate handling and to achieve a rapid setting of the optimum position of the row carrier, it is advantageous when the row carrier overlaps longitudinally on both sides of the rows of detector segments, and in each overlapping area there is one oval opening for the movement of the row carrier in the longitudinal direction, wherein in the central portion of the row carrier there is one oval opening for the movement of the row carrier in the transverse direction.

It is also advantageous if the row carrier is arranged on at least one flexible element embedded in the matrix, to remove clearance in the vertical direction and to avoid loosening the mounting screws holding the row carriers in the matrix.

The flexible element is preferably a metal flexible foil of arcuate cross-section, wherein the cavity beneath the arch of the metal flexible foil may comprise a cooling channel for cooling the detector.

It is also advantageous if the detector segment is fastened to the chip carrier by an adhesive. This achieves an absolute dimensional stability of the assembly of the detector segment and chip carriers. In the event of a faulty or defective dimension of the detector segment, the entire assembly with the detector segment and chip carrier is replaced, and a new detector segment is re-connected by the output of the conductor to the bus.

In other preferred embodiments of the invention, the row carriers are stored in tiered half-grooves in the matrix, in order to eliminate differences in height formed by depositing the overlap of the segment into a tiered stepped recess of an adjacent detector segment. Finally, it is advantageous if the matrixes of the chip carriers and the row carriers are made of aluminum alloy.

The matrix is in a classic design of detector constructed as a flat body, and the detection surface is formed as a substantially planar shape.

For some applications, e.g. for computed tomography or X-ray diffraction, it may be advantageous when the matrix is formed as a body shaped as a portion of a regular n-edge, where in each wall of the n-side there is a half-groove formed fitted by a row carrier with detector segments. The walls of the n-edge, as well as the normals of adjacent detector segments together enclose an apex angle and the rows of the detector segments thus form the inner walls of the n-edge. This embodiment enables for the creation of a detection surface with no height differences between the sensor layers of the chips in adjacent rows.

In another preferred embodiment of the detector, in the form of the n-edge the walls of the n-edge are not straight, but curved into convex or concave surfaces, preferably part of a cylindrical surface. The same applies to the curved and abutment portions of the row carriers and half-grooves.

In a preferred specific embodiment of the detector according to the invention, between the sensor layers of the adjacent detector segments in adjacent rows, in the plane of detector area, there is a gap typically less than 30 µm which is a value significantly smaller than the pixel size. The size of this gap is designed only by the accuracy of the manufacture of the mechanical parts. The entire detection area with the following minimum space is therefore fully sensitive.

In the vertical direction (i.e. perpendicular to the surface of the sensor layer), the height difference between the individual surfaces of the sensors in adjacent rows is typically in the range from 100 to 200 µm, which is a value less than the typical thickness of sensor layers used for imaging (300 µm or more). The entire detector surface can therefore be inclined to a plane of inclination of 0.4 to 0.8 The minimum value of this vertical displacement between the individual rows is determined by the minimum thickness of the reading chips (typically 50-120 µm) plus the thickness of the conductors for connecting the peripherals of the reader chips (typically 30 µm).

The detector can be assembled mosaically from any number of rows, and each row can be fitted with any number of detector segments. The maximum dimensions of the detection area are in no way limited. After removing one row, any damaged detector segment can be removed with the appropriate chip carrier. The contact of the detector segments with the matrix through the chip carrier and row carrier has good properties in terms of heat transfer and allows for efficient temperature control, i.e. cooling the detector.

The tight and adjustable arrangements of detector segments with fully active sensor layers, including the areas of their edges, with minimal clearance, allows for the creation of a complete continuous digital image of the scanned object without special hardware or software resources.

CLARIFICATION OF DRAWINGS

The invention will be more clearly illustrated by the drawings, which show as follows.

EXAMPLES OF THE PREFERRED EMBODIMENTS OF THE INVENTION

It should be understood that the specific examples of the invention described and illustrated below are presented for illustration and not as a limitation of the examples of the invention to these examples alone. Professionals familiar with the state of technology shall find, or will be able to determine through routine experimentation, a greater or smaller number of equivalents of the specific realization of the invention which are described herein. These equivalents shall also be included in the scope of the following claims.

The detector 1 shown in FIG. 1 to FIG. 9 is formed as a detector of X-rays, but with the use of suitable sensor layers 5 may also be adapted for the detection of other types of radiation. The base of the detector 1 is composed of a matrix 10 made of an aluminum alloy which carries the mosaic of detector segments 3 arranged in individual rows 4. Each detector segment 3 contains a square semiconductor pixel sensor layer 5 formed by a single semiconductor chip measuring 14.253×14.253 mm. The sensor layer 5 is active over its entire area, including the areas immediately adjacent the peripheral edges of the sensor layer 5. The square chips comprising the sensor layer 5 are produced by dividing a large area of the material, wherein a technology of dividing is used that does not degrade the active sensor layer 5 in the area of the dividing line.

Figure 1:
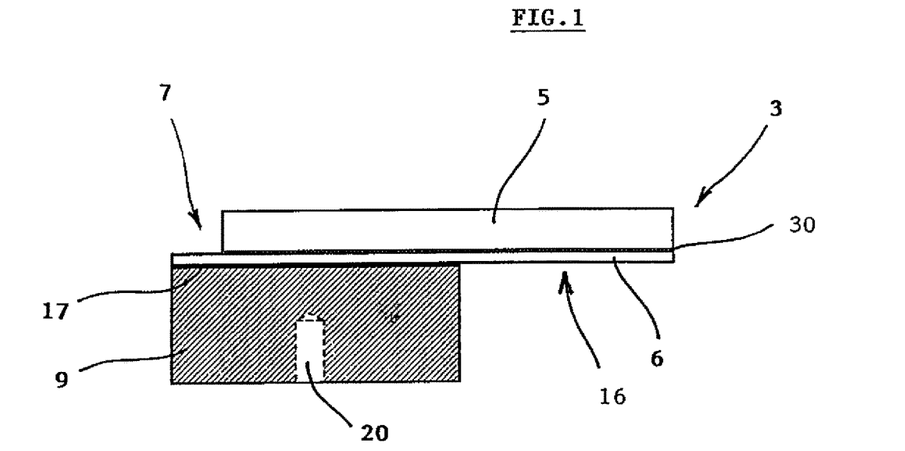
FIG. 1 side view of the assembly of the detector segment and the chip carrier.
Figure 2:
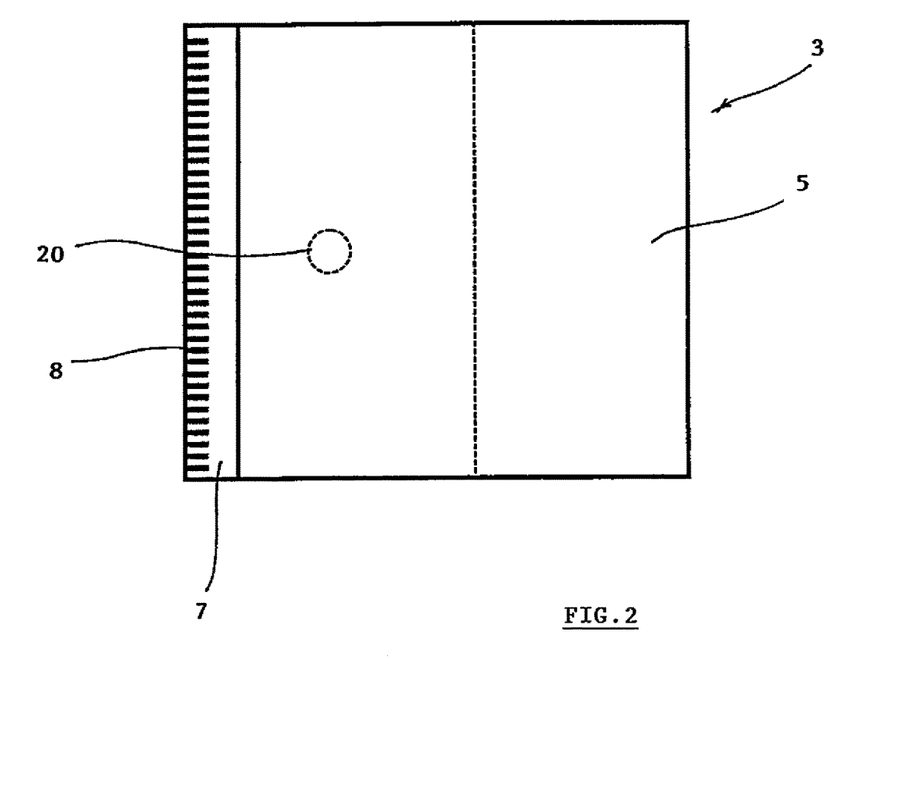
FIG. 2 plan view of the assembly of the detector segment and chip carrier.

The sensor layer 5 is, using the contact matrix 30, connected with the reader chip 6, which is arranged below the sensor layer 5. The chip reader 6, for example type Medipix2 of Timepix, overlaps the square sensor layer 5 on one side and generates a tier 7. From the edge of the chip reader 6 in the area of the tier 7, extend thin output conductors 8. The reader chip 6 is bonded with adhesive 17 on the upper surface of the chip carrier 9, which is made of aluminum alloy and has the shape of a cuboid. The sensor layer 5 and the reading chip 6 overlap, on the side opposite the tier 7 the chip carrier 9 by overhang 16. The end of the overhang 16 fits into the tier 7 of the detector segment 3 in the segment row 4.

FIG. 1 to FIG. 9 show an embodiment of the flat detector 1. The matrix 10 is a flat aluminum body in which half-grooves 29 are formed in tiers. In each half-groove 29 there is fastened, by means of mounting screws 25, a carrier 11, of rows 4, consisting of an aluminum "L" profile placed on a flexible element 26, which is a flexible metal arch of arcuate cross-section. The cavity in the arch of the foil may also serve as a cooling channel 28, for example If the detector 1 is cooled by a gaseous medium. Each carrier 11, of the row 4 can be positioned in relation to the matrix 10 and an appropriate row 4 can be set in the appropriate position with minimal spacing between the rows 4. Adjustments are made through oval adjustment holes 22, 23 in the carrier 11 and using the adjustment cams 24 placed in the matrix 10 and fitting into the adjustment holes 22, 23. The adjustment cams 24 and mounting screws 25 are operated from the outer side of the matrix 10.

Figures 3, 4:
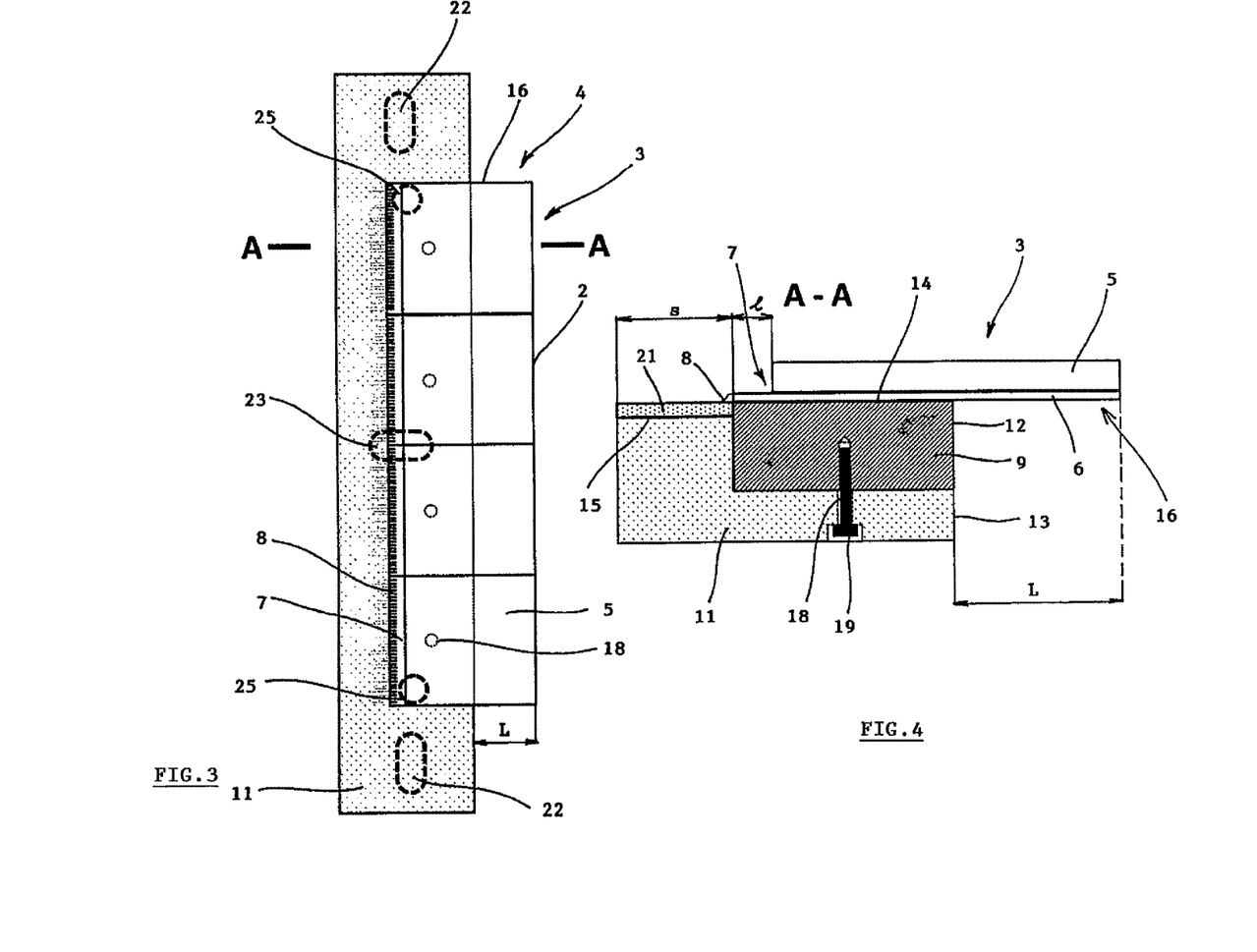
FIG. 3 plan view of the assembly of the row carrier including four the detector segments.
FIG. 4 sectional view of the assembly according to FIG. 3 line A-A.
Figures 5, 6:
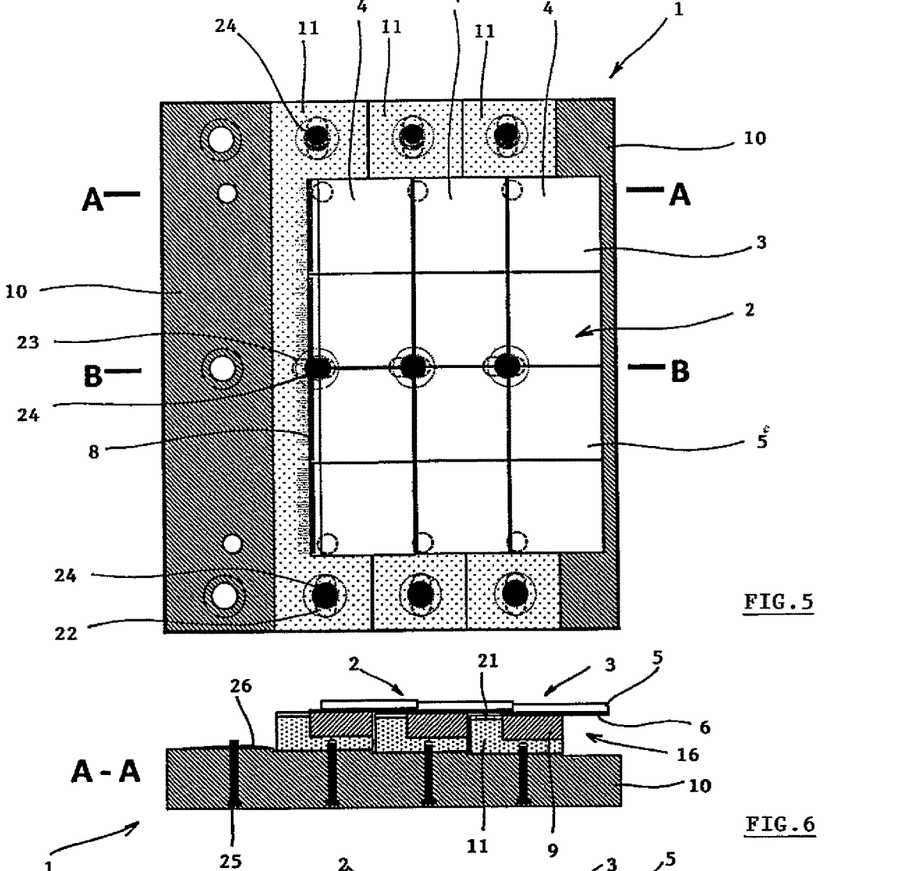
FIG. 5 plan view of the detector with the detection surface formed by three lines, each of four detector segments.
FIG. 6 sectional view of the detector according to FIG. 5 line A-A.
Figure 7:
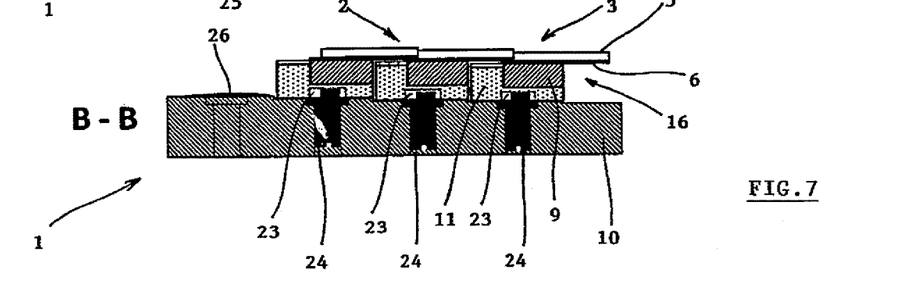
FIG. 7 sectional view of the detector according to FIG. 5 plane B-B.
Figure 8:
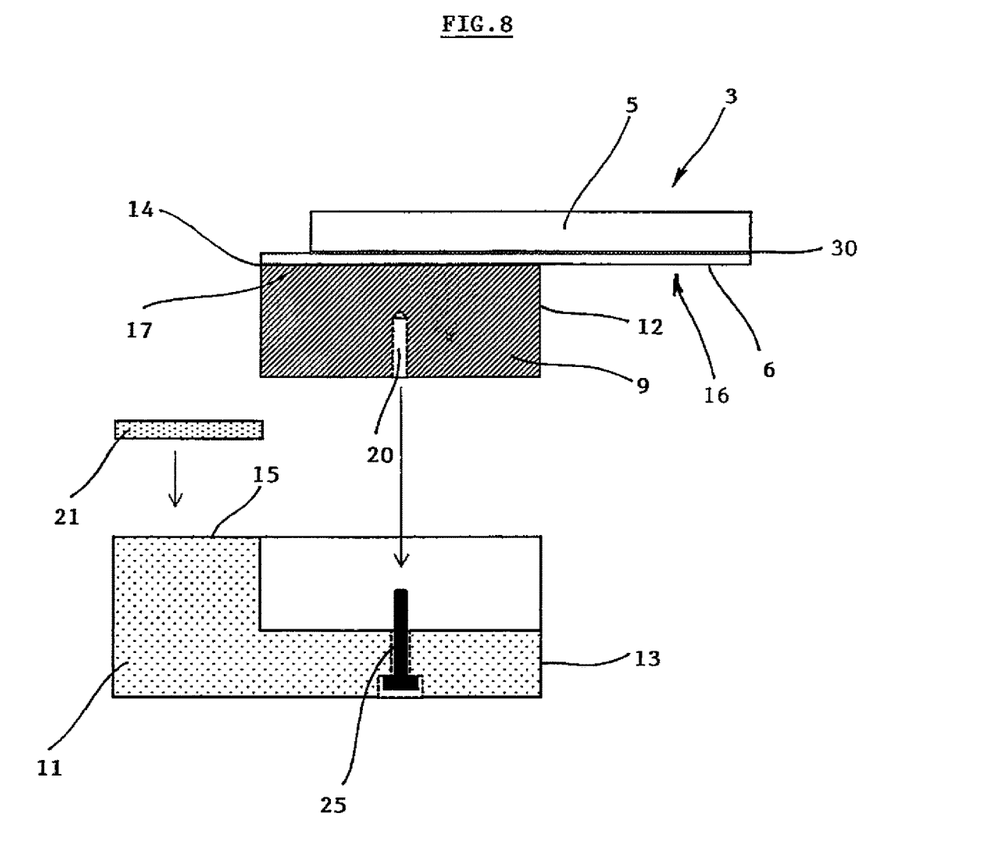
FIG. 8 schema of assembly of detector segment chip and chip carrier into the row carrier.
Figure 9:
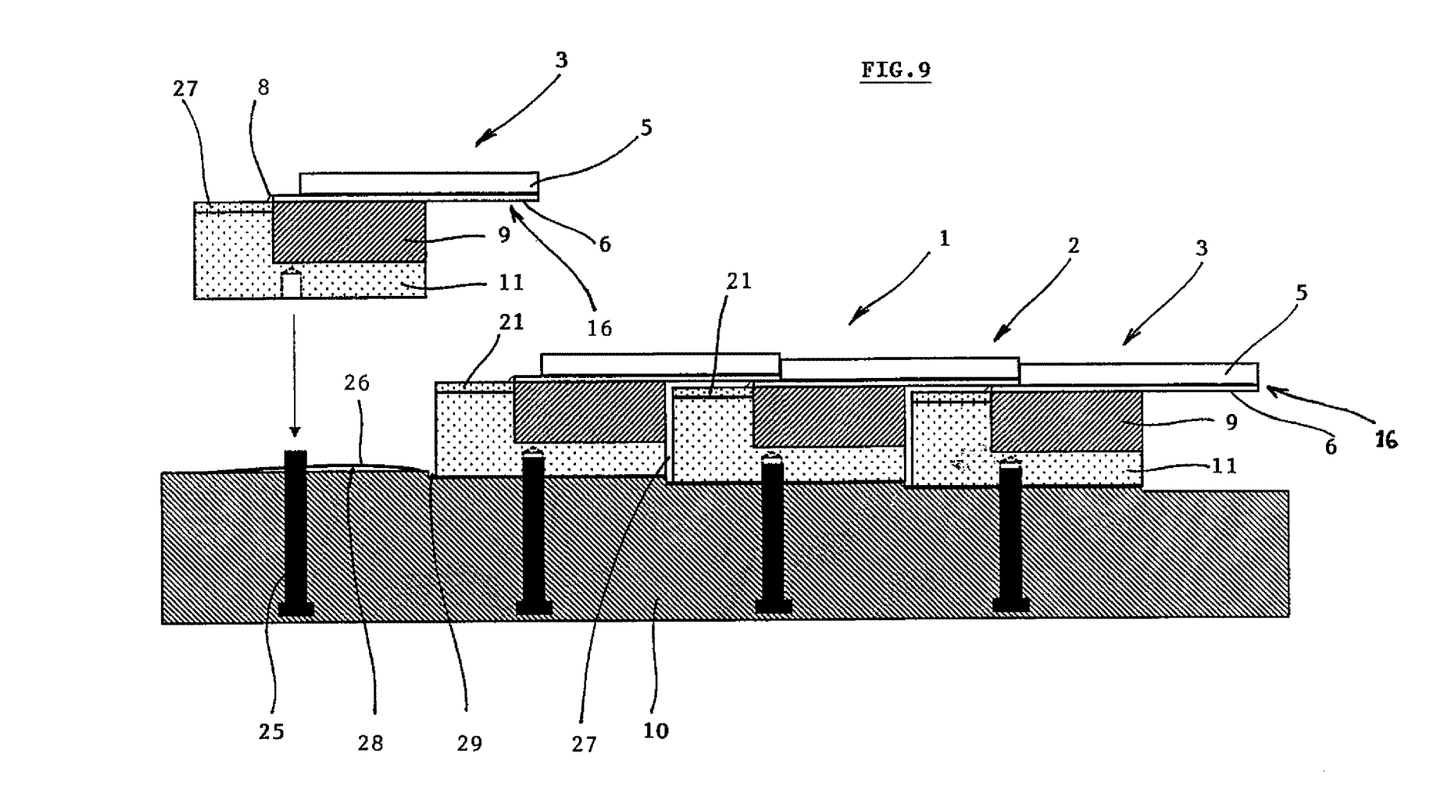
FIG. 9 sectional view of the detector with the detection area consisting of four rows, with a schematic representation of the assembly of the row carrier into matrix.

The chip carriers 9 with glued detector segments 3 are placed in the carrier 11 of rows 4 tightly next to each other, thus forming a single row 4 of detector surface 2. The mounting of chip carrier 9 to the carrier 11 of the rows 4 is carried out using the mounting screw 18 which passes through the carrier 11 of rows 4 and fits into the threaded hole 20 in the chip carrier 9. After removing the carrier 11 of rows 4 from the matrix 10, the mounting screw 18 can be loosened to dismantle the appropriate chip carrier 9 with the defective detector segment 3 and replaced with a new one.

The mutual arrangement of detector segments 3 in the carrier 11 of rows 4 is such that the length L of overlap 16 of the detector segment is greater than the sum of the length l of tier 7 and width of the vertical part of the profile "L" of the carrier 11 of the rows 4. On the upper edge 15 of the carrier 11 of the rows 4 are placed buses 21 for connecting the output conductors 8 of the detector segments 3. Between adjacent carriers 11 of rows 4 are formed technical passages 27 for placing electronic parts.

Figure 10:
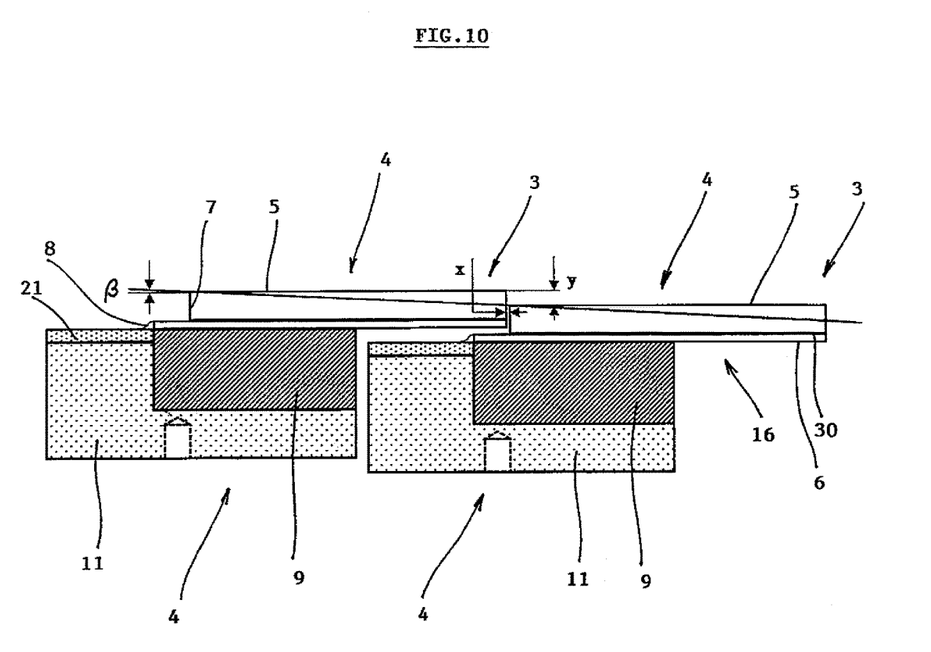
FIG. 10 detail of adjacent detector segments in adjacent rows of the detection areas in a cross-section.

FIG. 10 shows a detail of the planar detector surface 2 in cross section, showing the relative position of adjacent sensor surfaces 5 of the detector segments 3 in adjacent rows 4. The side clearance x between sensor layers 5 of the detector segments 3 in adjacent rows 4 in the plane of the detection surface 2 is 20 μm. The height difference % between the sensor layers 5 of the detector segments 3 in adjacent rows 4 in the plane perpendicular to the detection surface (2) is 200 μm. The angle of inclination β of detection area 2 is 0.8°.

Figure 11:
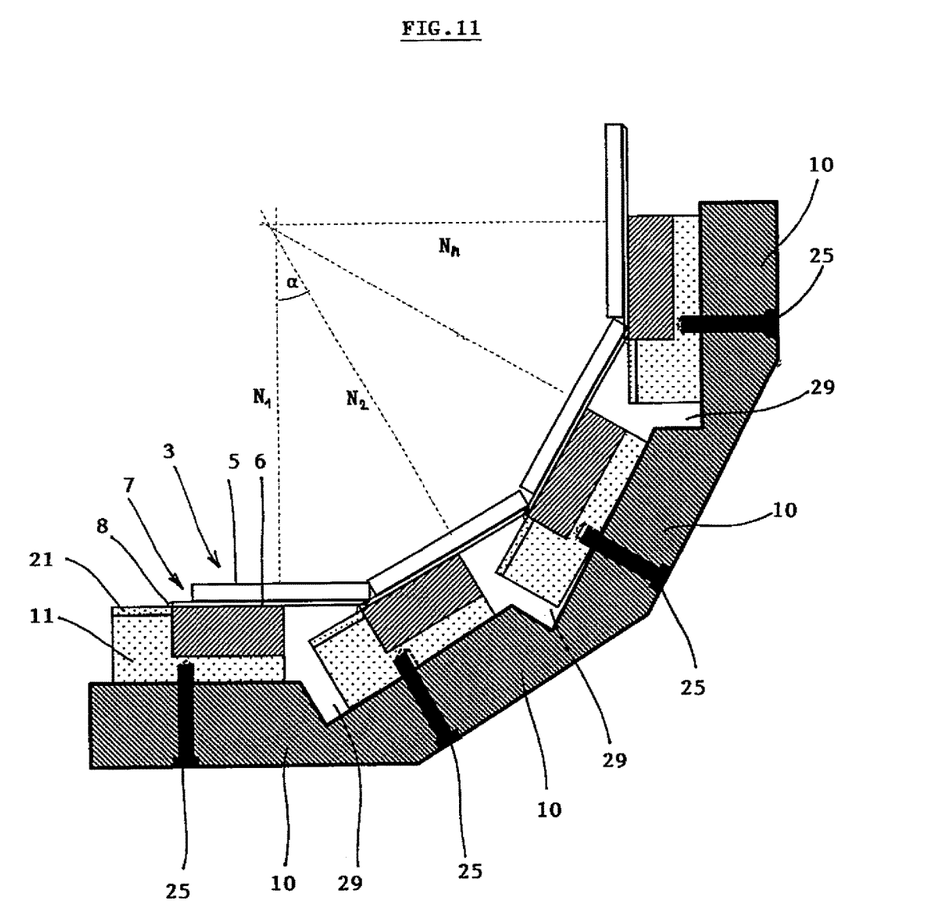
FIG. 11 example of the detector in the shape of an n-edge.

FIG. 11 shows another example of the embodiment of the detector 1. The matrix 10 here is not formed by a flat body, but by a body in the form of part of the casing of a 12-sided regular prism. Each wall of the prism on the inner side holds a half-groove 29, set with a carrier 11 of rows 4 with detector segments 3 on chip carriers 9. The normals $N_1$ to $N_n$ of the adjacent walls, half-grooves 29 and detector segments 3 together close the apex angle α. The carriers 11 of rows 4 are formed and positioned as in the previous examples. In another alternative, the body of the matrix 10 may also be of n-edges, and not straight but convex or concave, for example in the shape of part of a cylindrical surface. Their shapes are then appropriately modified as are the fitting parts of the half-grooves 29 and carriers 11 of rows 4.

INDUSTRIAL APPLICABILITY

A detector of Ionizing radiation according to the invention can be used to create a coherent digital image of a scanned object, especially in the fields of biology, biotechnology, medicine, flaw detection, non-destructive materials testing, product quality control, and other areas.

OVERVIEW OF THE SYMBOLS USED IN THE DRAWINGS 1 detector
2 detection area
3 detector segment
4 row of detector segments
5 sensor layer
6 reader chip
7 tier
8 output conductor
9 chip carrier
10 matrix
11 row carrier
12 side edge of the chip carrier
13 side edge of the row carrier
14 upper edge of the chip carrier
15 upper edge of the row carrier
16 overlap of detector segment
17 adhesive
18 mounting screw of the chip earner
19 head of the mounting screw of the chip carrier
20 threaded hole for the mounting screw of the chip carrier
21 bus
22 oval adjusting hole
23 oval adjusting hole
24 adjustment cam
25 mounting screw of the row carrier
26 flexible element
27 technical passage
28 cooling channel
29 half-groove
30 contact matrix
L length of overlap of detector segment
l length of tier of detector segment
s width of the vertical part of the carrier
x lateral clearance between the sensor layers of the detector segments in adjacent rows
y height difference between the sensor layers of detector segments in adjacent rows
β inclination angle of the detection area
$N_1$ normal of the first wall of the detector in the shape of part of an n-edge
$N_n$ normal n-th wall of detector in the shape of part of an n-edge
α apex of angle closed by the normals N

The invention claimed is:

1. A detector of ionizing radiation enabling the creation of a coherent digital image of a scanned object, including a matrix and detection area connectable using hardware and software with a display, where a detection surface forms mosaically arranged hybrid semiconductor pixel detector segments of square or rectangular shape, arranged side by side in rows, a detector segment consisting of a sensor layer arranged on a reader chip such that the edge of the reader chip on one side overlaps the edge of the sensor layer and creates a tier for receiving the edge of another detector segment of an adjacent row and in the area of the tier lead output conductors from the reader chip, each detector segment is mounted on a chip carrier which is removably attached to the matrix, wherein the sensor layer of the detector segment is active over the sensor layer entire area including areas adjacent peripheral edges of the sensor layer, the detector segments are positioned for limiting the mutual lateral clearance between the sensor layers of adjacent detector segments to a value smaller than a size of one pixel of the sensor layer of the detector segment, wherein the detector segments in relation to the matrix are arranged with a possibility of movement in four directions of a coordinate system in a plane of the matrix, and comprise at least one carrier of rows, which is mounted to the matrix with the possibility of relative movement and lockable in a selected position relative to the matrix, wherein in the carrier of the rows are, closely adjacent and parallel arranged, detector segments on carriers of chips such that a leading edge of the detector segments overlap beyond a contour of the carrier of the rows and a rear edge of the detector segments with tiered and output conductors are located on the carrier of the rows, wherein the carrier of the rows is formed by a longitudinal profile having a cross sectional shape of an "L" profile with a vertical portion and horizontal portion, the carriers of chips having a quadrangular cross section and are mounted in an "L" profile carrier of the rows side by side, wherein lateral edges of the carriers of chips are arranged in parallel with a side edge of the "L" profile, and upper edges of the carriers of chips are arranged at a same level or higher than an upper edge of the "L" profile, and the detector segments exhibit, compared to the side edge of the "L" profile and a side edges of the carriers of chips, an overlap for insertion into the tiers of the detector segments arranged in the adjacent row.

2. The detector according to claim 1 wherein a length (L) of the overlap of the detector segment is equal to or greater than the sum of a length (l) of tier and a width (s) of the vertical portion of the "L" profile of the carrier of the rows.

3. The detector according to claim 2, wherein the length (L) of the overlap of the detector segment is greater than the sum of the length (l) of tier and the width (s) of the vertical section of the profile "L" of the carrier of the rows, wherein between adjacent carriers of the rows is formed a technical passage.

4. The detector according to claim 1 wherein the carriers of chips are fastened to the horizontal portion of the "L" profile of the carrier of the rows by mounting screws with a head of the screw arranged on the underside of the carrier of the rows.

5. The detector according to claim 1 wherein an upper edge of the carriers of the chips overlap beyond an upper edge of the carrier of the rows and on the upper edge of the carrier of the rows there are mounted buses for connecting the output conductors of detector segments.

6. The detector according to claim 1 wherein the carrier of the rows is provided with at least two oval adjusting holes wherein into each hole there fits an adjusting cam placed into the matrix with operating elements accessible from outside the matrix and the carrier of the rows is fastened to the matrix by at least one mounting screw.

7. The detector according to claim 6, wherein the carrier of the rows overlap longitudinally on both sides of the rows of the detector segments and in each of the overlapping area is one oval hole for moving the carrier of the rows in the longitudinal direction, wherein in a central portion of the carrier of the rows there is one oval hole for moving the carrier of the rows in a transverse direction.

8. The detector according to claim 1 wherein the carrier of the rows is arranged on at least one flexible element embedded in the matrix.

9. The detector according to claim 1 wherein the flexible element is a metal flexible plane with arcuate cross-section.

10. The detector according to claim 1 wherein the matrix is provided with stepwise formed half-grooves in which the carriers of rows are mounted.

11. The detector according to claim 10, wherein the matrix is a flat body.

12. The detector according to claim 10, wherein the matrix is a body in shape of part of a casing of a regular n-edge, where each n-side edge on an inner side of the half-groove contains a carrier of the rows with the detector segments on carriers of the chips, wherein normals N1 to Nn of individual adjacent walls of the n-edge, the half-grooves and the detector segments together enclose a same apex angle (a).

13. The detector according to claim 12, wherein at least inner walls of the n-edge and mutually fitting surfaces of the half-grooves and carriers of the rows have a shape of a convex or concave surface.

14. The detector according to claim 13, wherein the inner wall of the n-edge and the mutually fitting surfaces of the half-grooves and the carriers of the rows have a shape of part of a cylindrical surface.

15. The detector according to claim 1 wherein the matrix, the carrier of chips and the carrier of rows are made of aluminum alloy.

16. The detector according to claim 1, wherein the lateral clearance (x) between the sensor layers of the detector segments in adjacent rows in a plane of the detector surface is not more than 30 µm, a height difference (y) between the sensor layers of the detector segments in adjacent rows in a plane perpendicular to the detection surface is in a range from 100 µm to 200 µm, and an inclination angle ($\beta$) of the detection area lies in the range from 0.4° to 0.8°.

* * * * *